United States Patent [19]
Avakian

[11] Patent Number: 5,242,257
[45] Date of Patent: Sep. 7, 1993

[54] VEHICLE LOADING SYSTEM

[76] Inventor: Emik A. Avakian, 67 Applewood Dr., Chicopee, Mass. 01022

[21] Appl. No.: 790,212

[22] Filed: Nov. 8, 1991

[51] Int. Cl.$^5$ .............................................. B60R 9/00
[52] U.S. Cl. .................................. 414/462; 414/546; 414/719; 224/310
[58] Field of Search ............... 414/546, 554, 556, 358, 414/462, 463, 466, 719, 728, 742, 921, 680, 522; 224/42.43, 42.21, 42.28, 42.29, 310; 298/13, 12, 14

[56] References Cited

U.S. PATENT DOCUMENTS

| | | | |
|---|---|---|---|
| 493,576 | 3/1893 | Corbit | 414/719 X |
| 2,704,160 | 3/1955 | Arvidsson | 414/546 |
| 3,627,158 | 12/1971 | Kobasic | 414/462 |
| 4,039,096 | 8/1977 | McAllister | 414/462 |
| 4,329,100 | 5/1982 | Golze | 414/462 X |
| 4,339,223 | 7/1982 | Golze | 414/462 |
| 4,350,471 | 9/1982 | Lehmann | 414/463 |
| 4,440,540 | 4/1984 | Gottlieb et al. | 414/546 X |
| 4,753,567 | 6/1988 | Achee, Sr. | 414/462 |

Primary Examiner—Frank E. Werner
Attorney, Agent, or Firm—Chilton, Alix & Van Kirk

[57] ABSTRACT

A gravity assisted lifting device which permits a load such as a folded wheelchair to be easily transferred between the cargo storage compartment of an unaltered passenger vehicle and the ground. The lifting device includes a pivotal frame, which raises and lowers the load between generally vertical and generally horizontal orientations, and a slide subassembly, which permits the load to be moved into or out of the storage compartment when in the horizontal orientation.

6 Claims, 8 Drawing Sheets

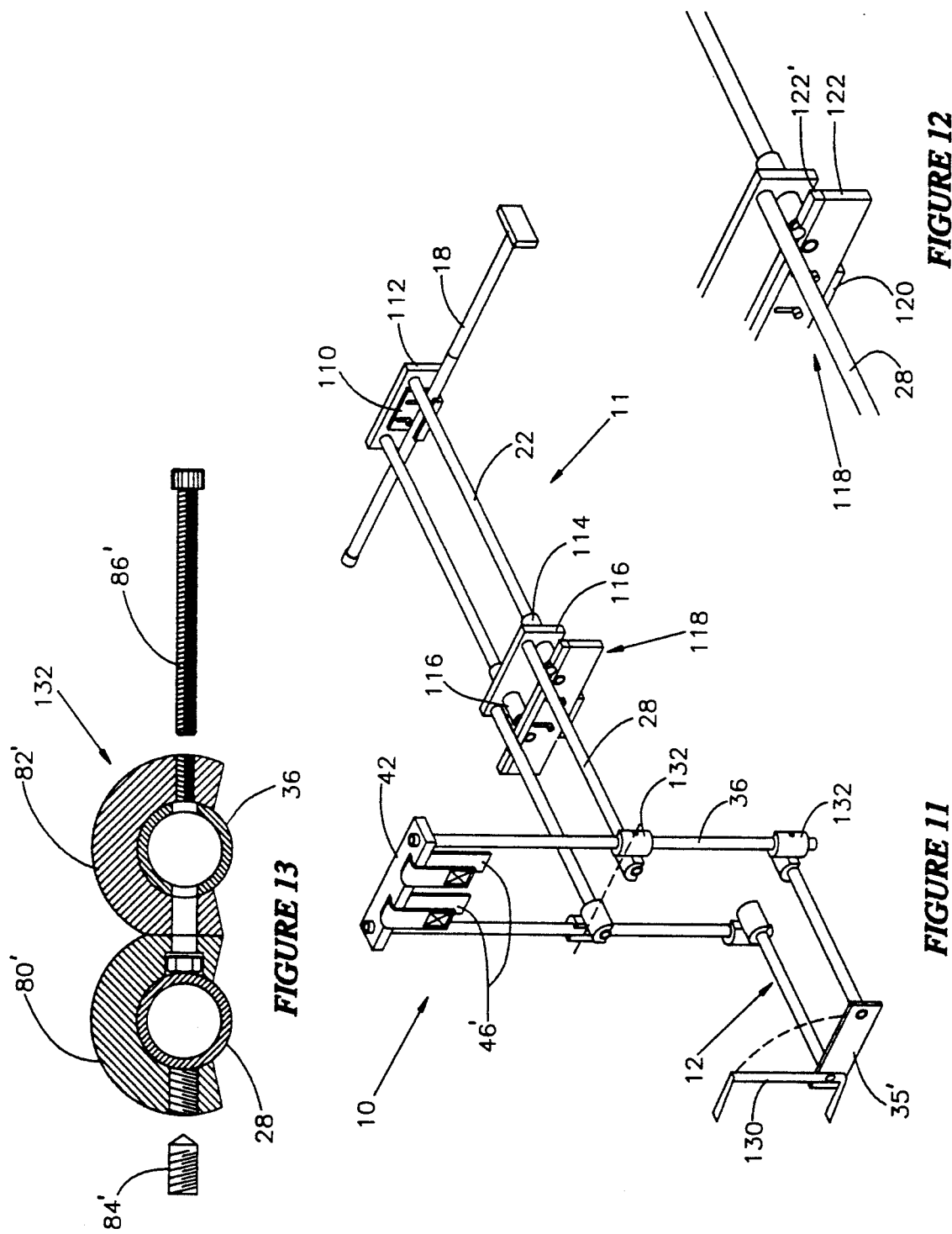

VEHICLE LOADING SYSTEM

BACKGROUND OF THE INVENTION

1. Field of the Invention

The present invention relates to the transfer of a load to or from the cargo space of a vehicle and particularly to facilitating the placement of a wheelchair in a storage compartment of a passenger vehicle. More specifically, this invention is directed to a manually operable, gravity assisted lift device for use in the loading of a foldable wheelchair or other load into the storage compartment of an automobile, the apparatus also enabling the extraction of such a load from the vehicle storage area and the placement thereof on the ground. Accordingly, the general objects of the present invention are to provide novel and improved methods and apparatus of such character.

2. Description of the Prior Art

While not limited thereto in its utility, the present invention has been designed for, and found to be particularly useful in, the manipulation of foldable wheelchairs, whereby such chairs may be easily retrieved from and returned to a storage compartment in an unmodified conventional passenger vehicle. The first folding X-frame wheelchair was introduced in the late 1930's and is disclosed in U.S. Pat. No. 2,095,411. The development of such foldable wheelchairs constituted a major step toward allowing nonambulatory disabled persons to travel by taking their wheelchairs with them in personal automobiles. Folding X-frame wheelchairs are today in widespread use. Importing foldability to a wheelchair, however, did little to reduce weight. Further, even when folded, wheelchairs are relatively difficult to load into the storage compartment of a passenger vehicle, the storage area of a "hatchback" body style automobile or station wagon for example, because of their weight and because their dimensions render the chairs awkward to handle.

There has been a long standing need for a lifting device, characterized by ease of both installation and use, suitable for transferring a folded wheelchair into and out of a motor vehicle storage compartment. Ease of installation of such a device dictates that major modification of the vehicle not be required. Ease of use dictates, in addition to not requiring unusual effort on the part of the user that the lifting device be capable of remaining in position in the vehicle rather than having to be partially or totally installed and dismantled on each occasion of use. Further requirements of a wheelchair lifting device include reliability, adjustability to accommodate vehicles of different size and body style and modest cost. Yet another requirement for a commercially acceptable wheelchair lift is that it occupy the minimum possible space in the vehicle storage area when not in use.

Previously proposed and available wheelchair lifting devices have been characterized by an inability to fulfill one or more of the above-outlined requirements. For example, various crane-like mechanisms have been proposed for hoisting a wheelchair into a vehicle storage compartment. Such hoisting systems are awkward to use and, in most cases, must be assembled for each use and then disassembled in order to be placed into the vehicle. As an alternative to these crane-like mechanisms, wheelchair carriers have been available which have been mountable on or from a vehicle bumper. A major problem with such carriers, however, has been that they store the wheelchair to the exterior of the vehicle and thus require a cover for protection of the chair. Such covers, regardless of how well designed, deteriorate by exposure to the elements and the user incurs the expense of periodic cover replacement if, in fact, replacement covers remain available.

SUMMARY OF THE INVENTION

The present invention overcomes the above-briefly discussed and other deficiencies and disadvantages of the prior art and, in so doing, satisfies all of the above-listed requirements for a wheelchair lifting device by providing a novel gravity assisted lever system and an associated slide assembly. Apparatus in accordance with a preferred embodiment of the invention includes a load support frame which is mounted at the first end of a tilt lever subassembly. The tilt lever subassembly is provided, at the opposite side of a pivot axis with respect to the load support frame, with a counterweight which assists in the raising of the folded wheelchair or other load from ground level to the level at which it will be temporarily stored in a vehicle. In the preferred embodiment, the size of the counterweight can be easily changed and its location can be easily varied with respect to the pivot axis. These counterweight adjustments permit the user to minimize the effort required to raise and lower a particular load while stabilizing the load support frame in the loading position.

The slide subassembly of the preferred embodiment cooperates with the tilt lever subassembly to permit the load and the frame in which it is supported to be easily moved in a generally horizontal direction into and out of a vehicle storage compartment. The slide subassembly is constructed such that neither the load, a folded wheelchair for example, or any component of the lift apparatus will interfere with normal operation of the vehicle storage compartment access door. The slide subassembly is also constructed such that it may be adjusted as a function of the dimensions of the storage compartment of the vehicle in which it is installed to insure that the load will clear any ledge such as, by way of example, may be present at the rear access end of the storage compartment of a "hatchback" body style vehicle.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which:

FIG. 11 is a perspective view of a second embodiment of the invention;

FIG. 12 is a partial enlarged view of the apparatus of FIG. 11 depicting the slide bearing thereof; and FIG. 13 is a cross-sectional view of a pivot connection of the apparatus of FIG. 11.

DESCRIPTION OF THE DISCLOSED EMBODIMENTS

Figure 1:
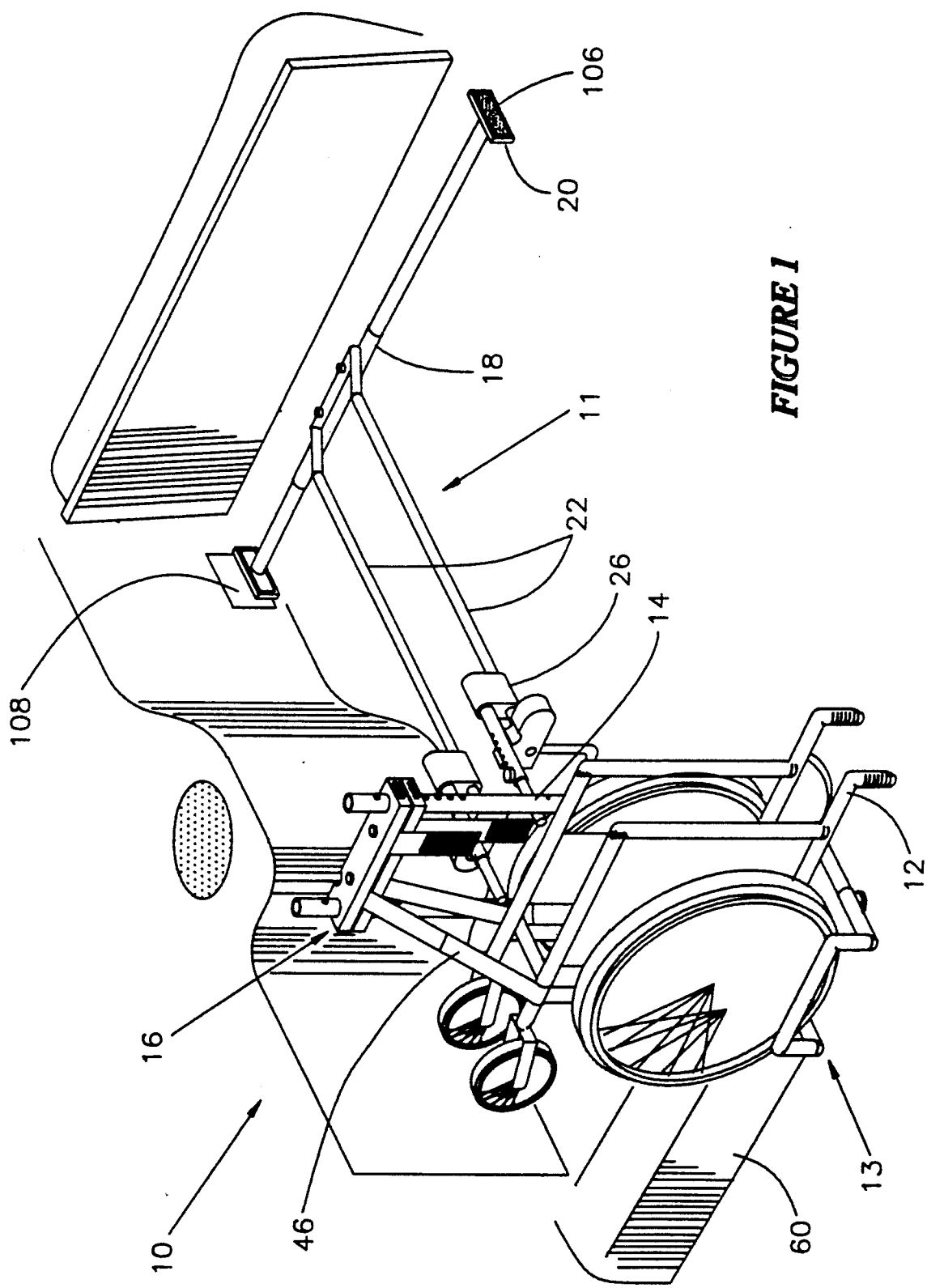
FIG. 1 is a perspective view which illustrates a lifting device in accordance with a first embodiment of the present invention installed in a motor vehicle cargo area, FIG. 1 also showing a folded wheelchair supported on the device.
Figure 3A:
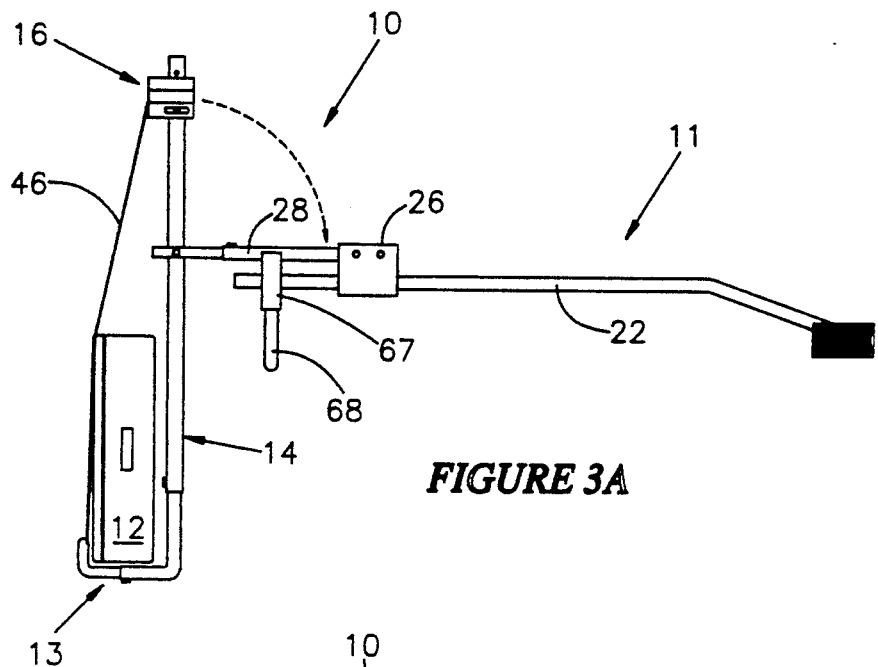
FIGS. 3A–C depict, in step-wise fashion, the use of the lifting device of FIGS. 1 and 2.
Figure 3B:
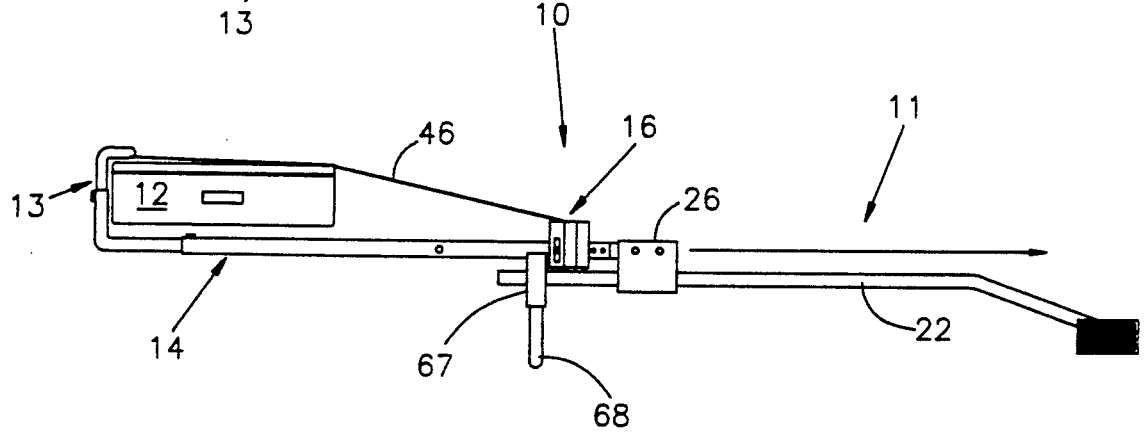
Figure 3C:
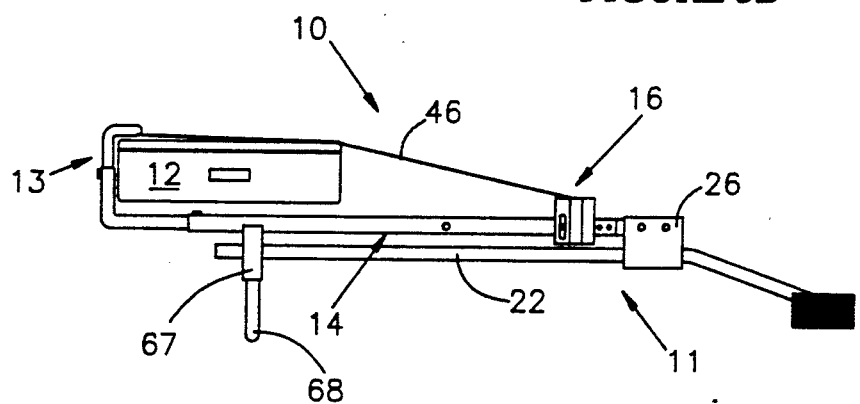

The present invention takes advantage of the force of gravity by employing a counterbalanced tilt lever subassembly, indicated generally at 10, in combination with a slide subassembly, indicated generally at 11, to provide a means for lifting a wheelchair or other cargo from ground level into the storage area of a passenger vehicle such as a "hatchback" body style or station wagon. In FIGS. 1 and 3, a folded wheelchair is indicated generally at 12. The wheelchair 12 is rolled onto a support frame, indicated generally at 13 and hereinafter referred to as the cargo foot, when the tilt subassembly s generally vertically oriented as depicted in FIGS. 1 and 3A. In the use of the disclosed embodiments, after being positioned on the cargo foot 13, the wheelchair 12 is rotated ninety degrees to the position shown in FIG. 1 since this rotated position permits more compact storage. The cargo foot 13 is located at first ends of a pair of lever arms, indicated generally at 14, which comprise the principle elements of tilt lever subassembly 10. Referring to FIG. 3B, and in the manner which will be apparent from the discussion below, the tilt lever subassembly comprising the lever arms 14 and cargo foot 13, with the wheelchair 12 positioned thereon, may be rotated into the horizontal position. In the manner to be described below, the lifting of the load from the "vertical" position of FIG. 3A to the horizontal position of FIG. 3B requires minimal effort and places the load at the level where it will be stored. As shown in FIG. 3C, once it has reached the position of FIG. 3B, the tilt lever subassembly 10 may be moved horizontally to the position of FIG. 3C through the aid of the slide subassembly 11.

The rotational movement of the tilt lever subassembly, i.e., the translation of the load from the position of FIG. 3A to the position of FIG. 3B, is permitted by providing each of lever arms 14 with a fulcrum or pivot connection which is located above the height of the floor of the vehicle cargo compartment. The fulcrums, three forms of which will be discussed below, define an axis of rotation for the lever arms. The effort required to cause the lever arms to rotate about this axis when a load is in place on the cargo foot 13 is minimized by counterbalancing the tilt lever assembly, i.e., a counterweight is provided on the lever arms 14 on the opposite side of the axis of rotation thereof with respect to the cargo foot 12. When the lever arms 14 are in the generally vertical orientation of FIGS. 1 and 3A, the center of gravity of the counterweight, which is indicated generally at 16, will be slightly to the rear of a plane defined by the axes of the lever arms 14. This positioning of the counterweight 16 on the same side of the lever arms 14 as the cargo foot 13 stabilizes the tilt subassembly in the cargo loading position. Once the wheelchair 12 or other cargo has been positioned on the cargo foot 13, a slight push of the counterweight 16 in a forward direction, i.e., in the direction which will cause it to pass through the vertical plane in which the axis of rotation lies, will allow the load to be brought up to the horizontal position of FIG. 3B with minimal effort.

The counterweight 16 will be selected so as to be sufficiently heavy to balance the weight of the load which, in the case of a wheelchair, will always remain the same. However, since different chairs will have different weights, provision is made to allow the mass of the counterweight to be easily varied. Additionally, the spacing of the counterweight 16 from the pivot axis is also variable. Thus, the user may "fine tune" the lifting device to his or her needs by adjusting both the size and position of the counterweight 16.

Figure 2:
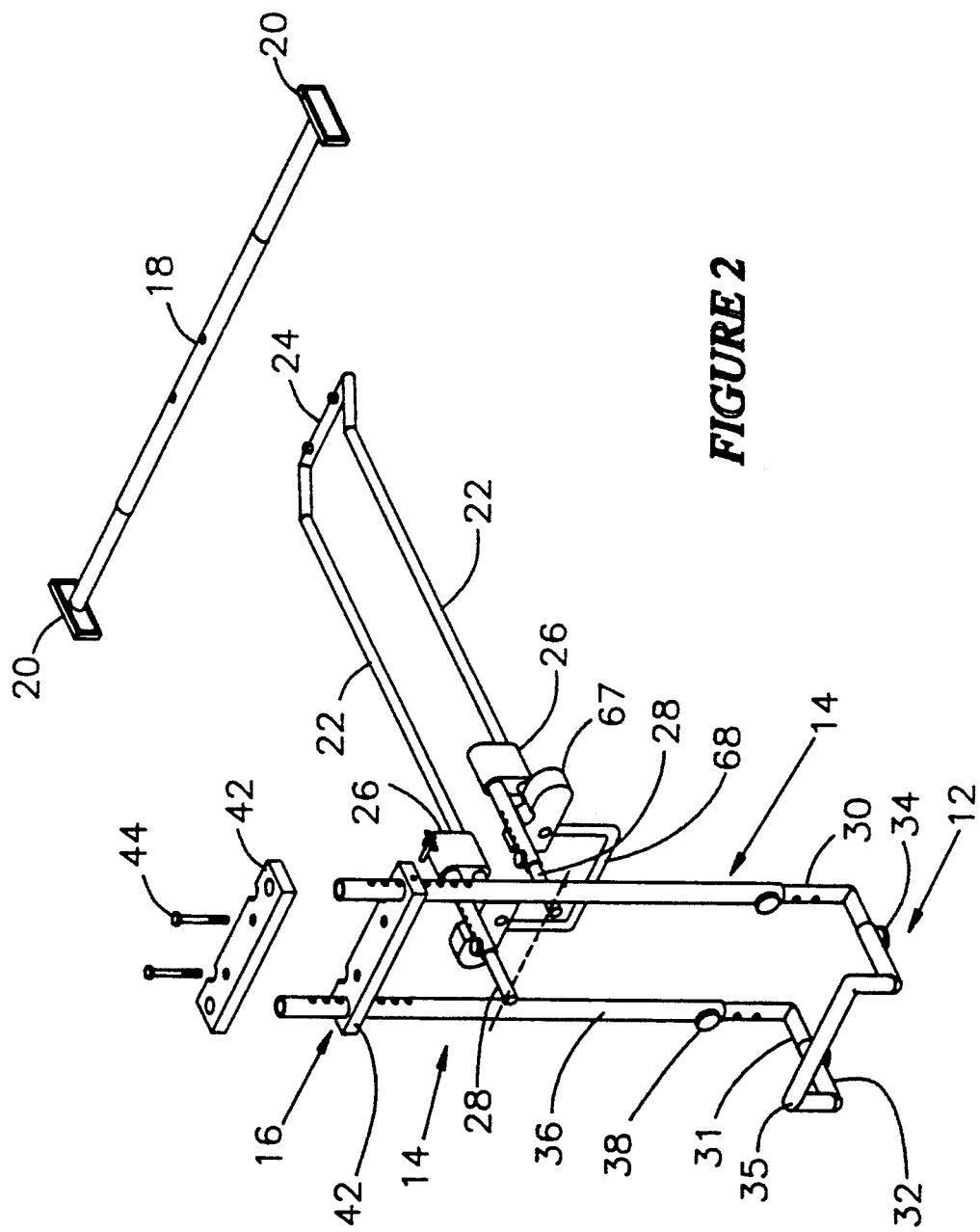
FIG. 2 is a partially exploded, perspective view of the lifting device of FIG. 1 with the wheelchair load removed.

Lifting devices in accordance with the invention are characterized by ease of installation in a motor vehicle storage area. The slide subassembly may thus include a telescoping load bar 18 which engages, via a pair of feet 20, the side walls of the vehicle cargo compartment. The slide subassembly also includes parallel guide rails 22. In the embodiment of FIGS. 1-3, the parallel guide rails 22 are coupled to the load bar 18 via a cross bar member 24 which may be integral with the guide rails. The guide rails 22 are slidably coupled to guide rail extensions 28. A first form of slide coupling for use in practice of the invention is indicated at 26 in FIGS. 1-3. The lever arms 14 are pivotally coupled to the guide rail extensions 28 by the fulcrums while the slide couplings are movable along the guide rails 22. As will be described in more detail below, the guide rails 22 may be raised and lowered to a proper height to permit the entire slide subassembly to be located at a level which will insure that the load will clear any ledge that extends above the floor of the vehicle cargo compartment at the rear of the loading area.

The apparatus discussed above will now be described in more detail with particular reference to the embodiment of FIGS. 1-3 and the embodiment of FIGS. 11-13. It should initially be noted that a lift device in accordance with the present invention is preferably symmetrical about a vertical plane located midway between the guide rails 22. Such symmetry minimizes cost since components located to the left of this vertical plane are interchangeable with those located to the right of the plane.

In the embodiment of FIGS. 1-3, as may clearly be seen from FIG. 2, the lever arms 14 are each comprised of a pair of cooperating tubular members. The first of these tubular members is generally "L"-shaped and indicated at 30. The foot portions 31 of these L-shaped members 30 form part of the cargo foot 12 and are telescopingly received in the ends of a cargo foot retaining extension 32. Through the use of adjustment knobs 34, the spacing between the upwardly extending rail portion 35 of the cargo foot extension 32 and the lever arms 14 may be adjusted to accommodate the dimensions of the load with which the device is to be used.

Figure 7:
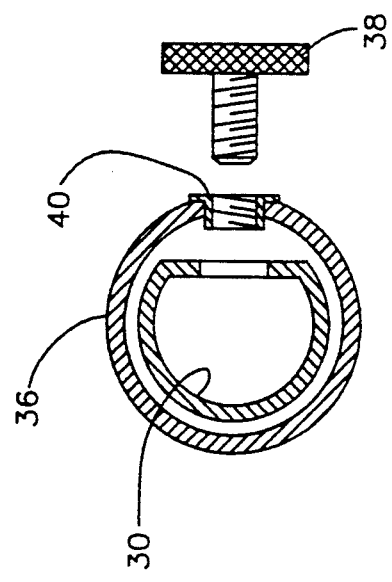
FIG. 7 is a cross-sectional view of an adjustable length lever arm of a tilt subassembly for use in the invention.

The leg portions of the L-shaped tubular members 30 are telescopingly received in tilt tubes 36 and the length of the tilt subassembly at the load side of the axis of rotation may be adjusted by using adjustment knobs 38. As shown in the enlarged view comprising FIG. 7, the adjustment knobs 38 have threaded bolt extensions which engage threaded inserts 40 in the outer of the two telescoping tubes. The inner or smaller diameter tube is provided with a linear array of holes which receive the adjustment knob bolt extension. The smaller diameter tube, which is the leg portion of the L-shaped tubular member 30 in the example being described, has a section of its circumference flattened as shown and the array of bolt receiving holes is formed in this flattened portion. The flattening of the side of the tube aids in locating the holes during adjustment while the employment of the threaded inserts 40 allows the use of thinner-walled tubes and thus reduces the weight of the lift device. As an alternative to the arrangement of FIG. 7, a system similar to that presently used in adjustable tubular aluminum crutches can be employed, such a system utilizing cooperating pairs of spring-loaded pins. Other arrangements for adjusting the length of the lever arms 14 are, of course, possible.

Once the lifting device of the present invention has been installed, it may be left in position in the vehicle and will occupy little space when not in use. The space requirements for the installed lifting device of the embodiment of FIGS. 1–3 are minimized by simply loosening the adjustment knobs 34 and removing the cargo foot retaining extension 32. Also, the adjustment knobs 38 will be loosened and the L-shaped tubular members 30 rotated ninety degrees so as to place the axes of the foot portions 31 thereof in the plane defined by the axes of the tilt tubes 36.

The counterweight 16 is coupled to the two tilt tubes 36 adjacent the opposite end, i.e., the end disposed oppositely with respect to the L-shaped members 30. In the disclosed embodiments, the counterweight is in the form of one or more elongated, flat steel or lead bars 42. These bars are provided with through-holes 43 which receive the ends of the tilt tubes 36. The tilt tubes are each provided with a second linear array of adjustment holes and at least the first of the counterweights 42 to be installed will be provided with holes which communicate between a side surface of the counterweight and the adjustment holes in the tilt tubes. Conventional quick release pins may be installed in at least the lower counterweight 42 to permit the counterweight to be easily installed and its longitudinal position on the tilt tubes adjusted. If the lower counterweight 42 is of insufficient mass to properly counterbalance the load, additional counterweights 42 may be installed on the tilt tubes and the counterweights will be bolted together, employing bolts 44, to form an integral structure.

Referring to FIG. 1, in one reduction of practice of the invention, an elastic strap 46 was engaged in any suitable manner by the counterweight 16. The elastic strap 46 was provided with complementary hooks on its opposite ends and was employed to secure the load to the tilt subassembly.

The fulcrums, i.e., the pivot connections between the tilt tubes 36 and the tubular guide rail extensions 28, can be defined by a nylon sleeve which passes through the two tubular members. In such case, a spacer will typically be positioned on the sleeve between the relatively rotatable tubular member and a bolt will pass through the sleeve and function as an axle. Alternatively, fulcrums such as depicted in one of FIGS. 4, 5, 6 or 13 are preferred. The fulcrum assembly of FIG. 4 comprises a pair of cooperating steel clamps 48 and 50. Clamp 48 engages a guide rail extension 28 adjacent the free end thereof. Clamp 50 will engage a tilt tube 36. The clamps 48 and 50 are spaced apart by a washer 52 which may be comprised of a material having a low coefficient of friction. A threaded portion of a first bolt 54 engages a first flange on clamp 48 and the end of the bolt contacts the oppositely facing flange. The tightening of bolt 54 will cause the clamp 48 to tightly engage rail extension 28. A second bolt 56 will be provided with an unthreaded shank portion which passes through the flanges of clamp 48 and the washer 52. A threaded portion of bolt 56 engages a first flange on clamp 50. The end of bolt 56 operates against the opposite flange of clamp 50 to cause the clamp to tightly engage tube 36. A second low friction washer 58 spaces the head of bolt 56 from the outer surface of clamp 48. The arrangement of FIG. 4 permits the bolt 56 to function as an axle and thus allows clamp 50 and tilt tube 36 to rotate relative to clamp 4 and guide rail extension 28.

Figure 5B:
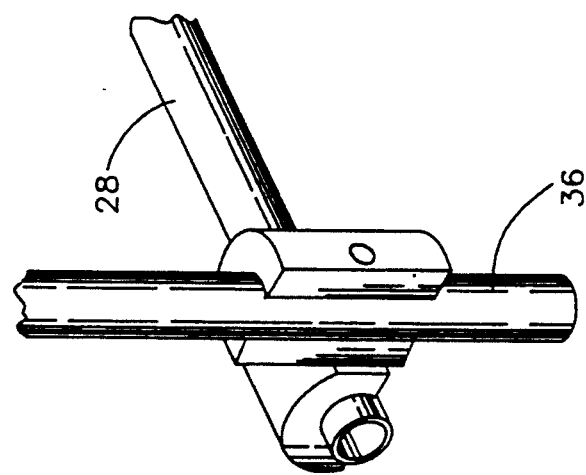
FIGS. 5A and 5B depict, respectively in cross-section and a perspective view, a second fulcrum device for use in the present invention.
Figure 4:
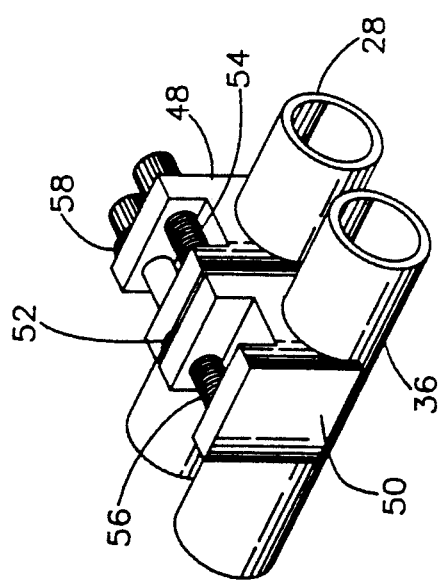
FIG. 4 is a perspective view of a first fulcrum device for use in the present invention.
Figure 5A:
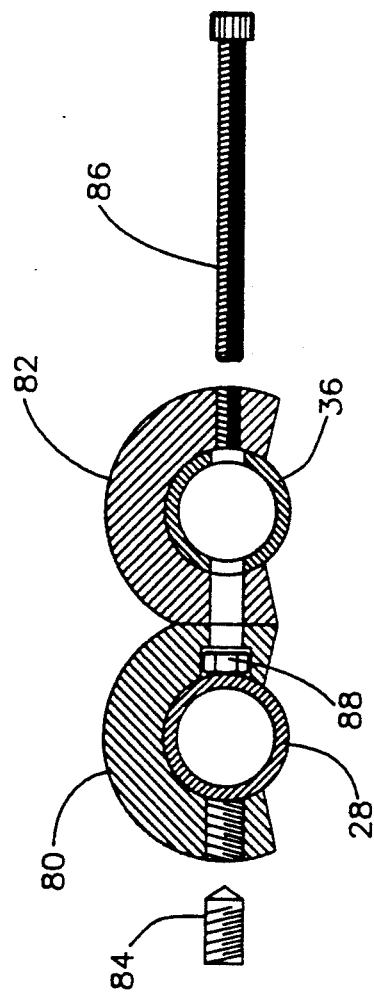

An alternative pivot connection between a tilt tube 36 and a guide rail extension 28 of the slide subassembly is depicted in FIGS. 5A and 5B. In FIG. 5A, the fulcrum is shown in a cross-sectional view with the tilt tube pivoted so that its axis is parallel to the axis of the guide rail extension. In FIG. 5B, the tilt tube and guide rail extension are shown in the loading/unloading position where their axes are generally transversely oriented. The fulcrum of FIGS. 5A and 5B comprises a pair of collars 80, 82 which are provided with flat, abutting bearing surfaces. The collar 80 is locked to the guide rail extension 28 by means of a set screw 84 while a pivot pin 86 threadably engages collar 82 and passes through both collar 82 and the tilt tube 36 and into the collar 80. The end of pivot pin 86 is captured in collar 80 by means of a nut 88.

Figure 6B:
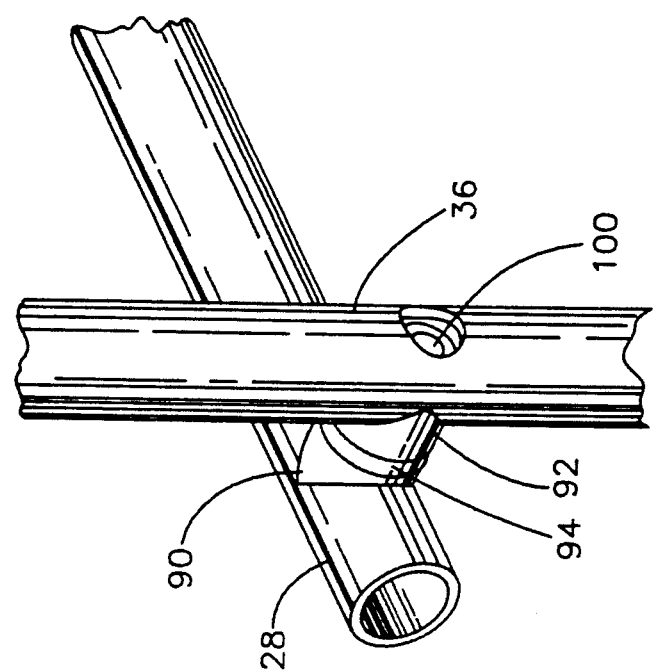
FIGS. 6A and 6B depict, respectively in cross-section and a perspective view, a third fulcrum device for use in the present invention.
Figure 6A:
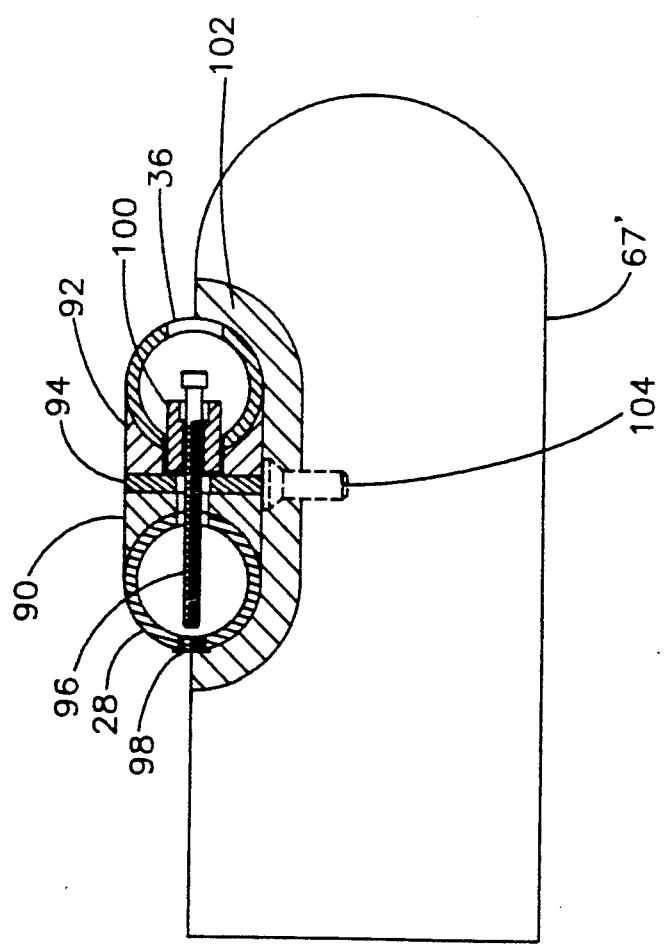

A third alternative pivot device is shown in FIGS. 6A and 6B which, respectively, are cross-sectional and perspective views with the parts in the same relative orientation as depicted in FIGS. 5A and 5B. The fulcrum of FIGS. 6A and 6B includes a pair of spacers 90 and 92 which respectively engage the guide rail extension 28 and tilt tube 36 as may best be seen from FIG. 6B. The spacers 90 and 92 are separated by a washer 94 which defines the bearing surfaces. As shown in FIG. 6A, a bolt 96, which engages a threaded insert 98 in the guide rail extension 28 defines the axis of rotation for the tilt tube 36. The bolt 96 passes through a tube 100 comprised of a material having a low coefficient of friction, the tube 100 being press fit into the spacer 92 and thus being rotatable about tube 100. FIG. 6A also shows a modified form of the slide rail support 67 of FIG. 2, the slide rail support of FIG. 6A being in the form of a plate having a cut-out into which an insert 102 comprised of a material having a low coefficient of friction is secured by means of a screw 104.

Figure 10B:
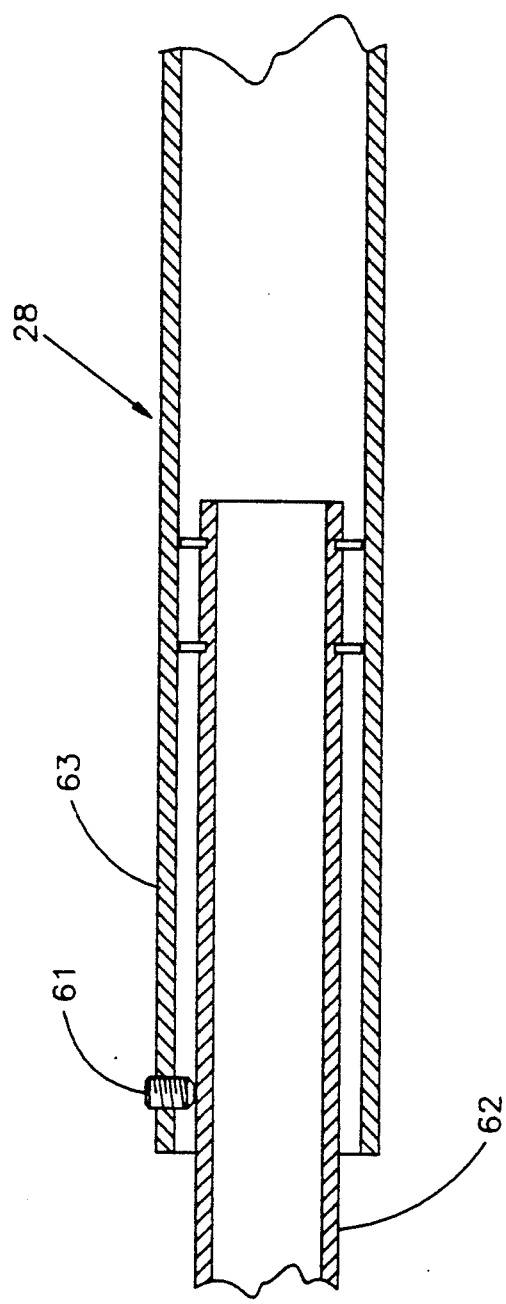
FIGS. 10A and 10B are respectively cross-sectional front and side views of an adjustable length guide rail extension for use in the slide subassembly of the invention.
Figure 10A:
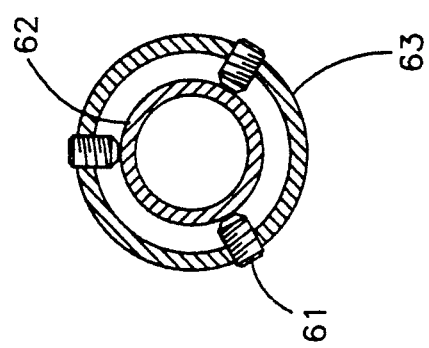

Because of variations in the size and shape of different vehicles, and particularly the different bumper extensions, it is necessary that the guide rail extensions 28 also be of adjustable length so that the axis about which the tilt subassembly rotates may be located in a vertical plane which is positioned behind the vehicle bumper (indicated at 60 in FIG. 1). The requisite adjustability may be imparted to the rail extensions 28 in several ways. The least complicated way to adjust the rail extension is to employ a tube of fixed length and vary the point of attachment of such fixed length tube to the associated slide coupling. As an alternative, a first end of a tubular guide rail extension 28 may be semi-permanently captured in a slide coupling and the tube can be comprised of two members which telescope as, for example, shown in FIGS. 10A and 10B. In the case of a telescopic guide rail extension, the set screws 61 which lock the smaller diameter tube 62 in the longitudinal position corresponding to the desired rail length must not protrude beyond the outer surface of the larger diameter tube 63 so as to not interfere with the sliding action a the load is shifted between the position of FIG. 3B to the position of FIG. 3C.

Figure 8:
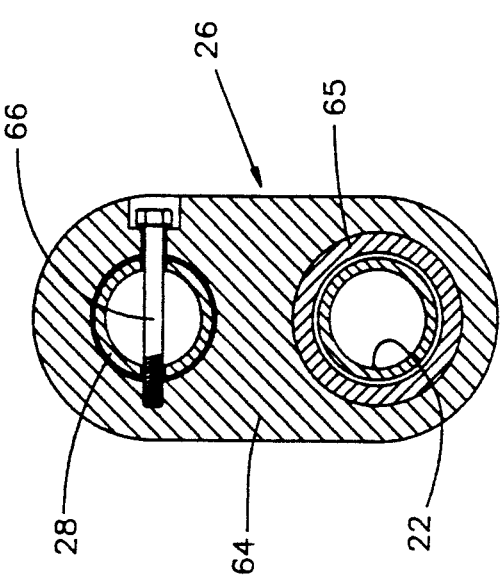
FIG. 8 is a cross-sectional view of a slide coupling suitable for use in the slide subassembly of the invention.

One of the slide couplings 26 of the embodiment of FIGS. 1-3 is shown in cross-section in FIG. 8. The slide coupling 26 comprises a block 64 formed of any suitable material, aluminum for example, which has parallel through-holes for receiving a guide rail 22 and a guide rail extension 28. A bushing 65 of a suitable low-friction material is mechanically captured and/or adhesively secured in the block 64 of the slide coupling 26 and the guide rail 22 passes through this bushing whereby ease of movement of the coupling along the guide rail is insured. The guide rail extension 28 is fixed to the body of the coupling 26 by suitable means such as, for example, through use of the bolt 66 which threadably engages the coupling and passes through a hole provided therefor in the rail extension.

Figure 9:
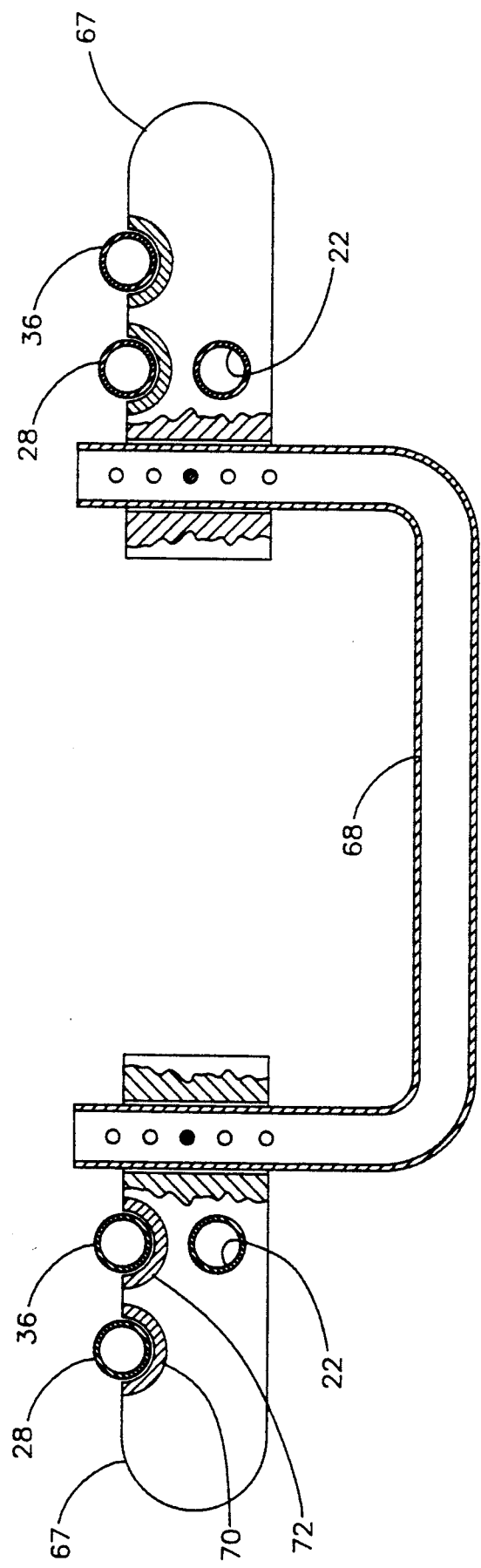
FIG. 9 is a front elevational view of a slide bearing for use in the slide subassembly of the invention.

The slide subassembly of a lifting device in accordance with FIGS. 1-3 also includes, as best seen from FIG. 9, a pair of slide bearing housings 67 which are interconnected by means of a generally U-shaped support tube 68. The bearing housings 67 slidably support, respectively on arcuate inserts 70 and 72 comprised of low-friction material, the tilt tubes 36 and the guide rail extensions 28. Since the tilt tubes 36 will engage and disengage from the bearing surfaces by a pivoting motion, the arcuate inserts 72 are approximately 180° in length. The ends of the arcuate inserts 70 which face the slide couplings 26 are provided with tapers so that, as the load is moved from the position of FIG. 3C to the position of FIG. 3B, the free end of the guide rail extension (and any lip intermediate the length of the guide rail extension if a telescoping extension is employed) will not "hang up" on the slide bearing housing. The slide bearing housings 67 are immobilized on the guide rails 22 adjacent the ends thereof disposed oppositely with respect to the load bar 18. The coupling of the guide rails to the slide bearing housings is accomplished in any suitable manner and is not detailed in the drawings. The support tube 68 is adjustable relative to the slide bearing housings 66 to insure that the spacing of the tilt subassembly from the floor of the vehicle cargo area will be sufficient to permit loading. The support tube 68 also insures that the guide rails 22 will be parallel.

The cross bar 24 of the FIG. 1-3 embodiment can be directly bolted to the floor of the vehicle. As an alternative, which has been found to usually provide sufficient support and eliminate the need for alteration of the vehicle, the load bar 18 will be employed. The cross bar 24 will, of course, be secured to the load bar 18 when the latter is employed. Load bars of the type depicted in FIGS. 1 and 3 are commercially available and typically have a pair of oppositely directed spring-loaded extensions which urge the feet 20 against the side walls of the vehicle cargo area. To insure retention of the load bar 18 in the vehicle, the feet 20 thereof may be provided with "Velcro" pads 106 and cooperating "Velcro" pads 108 may be adhesively secured to the side walls of the vehicle cargo area as indicated in FIG. 1.

A somewhat modified form of the invention is depicted in FIG. 11. The FIG. 11 embodiment differs from the above-described embodiment principally in terms of adjustability. Thus, the vertical spacing between the guide rails 22 of the slide subassembly 11 and the load bar 18 is easily adjustable in the FIG. 11 embodiment by the use of a pair of relatively movable plates 110 and 112. The first of these plates 110 is J-shaped and clamped to the load bar 18 while the other plate 112, which is flat, is secured to the guide rails 22. The plate 112 is slidable relative to the plate 110 with the movement being controlled by a pair of locking bolts which travel in slots in plate 110.

As a further distinction, in the embodiment of FIG. 11, the two slide couplings are integrated, i.e., a plate 114 extends between the guide rails 22 with the guide rails passing through sleeves 116 comprised of a material such as "Teflon" which are captured in the plate 114. The guide rail extensions 28 are affixed, in any suitable manner, to the plate 114.

Also in the embodiment of FIG. 11, the slide bearing housings 67 of the embodiment of FIGS. 1-3 are integrated into a variable height plate assembly, indicated generally at 118, which is similar to the above-described adjustable plate assembly at the opposite end of the guide rails 22. FIG. 11 provides an enlarged view of adjustable plate assembly 118 which comprises a foot member 120 and a two-piece plate member 122. The forwardly disposed ends of the guide rails 28 are secured, in any suitable manner, to the plate 122, and the upper portion of plate 122' is preferably formed from a low friction material such as "Teflon" which is provided on its upper surface with guide grooves for the guide rail extensions 28 and the tilt tubes 36.

Also in the embodiment of FIG. 11, the cargo foot 12 is pivotally coupled to the tilt tubes, so that it may be folded for storage rather than being removed when the lift device is not in use. The embodiment of FIG. 11 also has a load-retaining bar 130, pivotally coupled to the upwardly extending rail portion 35' of the cargo foot. This pivotal retaining bar 130 also serves as a handle for tilting the tilt subassembly relative to the slide subassembly.

To simplify construction, all four of the fulcrums 132 of the apparatus of FIG. 11 can be of identical construction and, for example, may take the form shown in FIG. 13 which is a slightly modified form of the pivot connection of FIGS. 5A and 5B.

While preferred embodiments have been shown and described, it will be understood that various modifications and substitutions may be made thereto without departing from the spirit and scope of the invention. Accordingly, the present invention has been described by way of illustration and not limitation.

What is claimed is:

1. Apparatus for transferring a load into and out of a motor vehicle storage compartment comprising:
    means defining a tilt frame, said frame defining means including a pair of elongated parallel lever arms, each of said arms having an axis, the axes of said arms defining a first plane;
    means for receiving and supporting the load;
    means for coupling said load receiving means to said tilt frame defining means at first ends of said lever arms, said coupling means positioning said load receiving means at a first side of said first plane;

means for counterbalancing the load positioned on said load receiving means, said counterbalancing means comprising at least a first weight coupled to said tilt frame defining means, the center of gravity of said counterbalancing means being located on said first side of said first plane;

slide means, said slide means being pivotally connected to said lever arms of said tilt frame means intermediate said counterbalancing means and said load receiving means, the connection between said slide means and said tilt frame means defining a pivot axis for said tilt frame, said pivot axis lying in said first plane, a combined length of said tilt frame means and said load receiving means on a first side of said pivot axis being adjusted to a length which permits said tilt frame means to be placed in a substantially vertical load receiving orientation, the weight and position of said counterbalancing means being selected such that said tilt frame assembly will be stable when unloaded and in said load receiving orientation;

means defining a path for linear reciprocal movement of said slide means, said movement path defining means including at least a first guide rail; and means for mounting said path defining means in a vehicle storage compartment with said path of linear reciprocal movement lying in a second plane which is angularly related to said first plane whereby the load may be raised to the level of a plane which is parallel to said second plane by manually rotating said tilt frame defining means about said pivot axis, and the load may thereafter be moved into the vehicle storage compartment by manually imparting movement to said slide means in a first direction of the reciprocal movement thereof.

2. The apparatus of claim 1 wherein the position of said counterbalancing means may be varied relative to said pivot axis.

3. The apparatus of claim 1 wherein said slide means comprises:

a pair of elongated parallel guide rail extensions, the axes of said guide rail extensions defining a second plane;

means pivotally coupling first ends of said guide rail extensions to respective of said lever arms whereby said tilt frame may be pivoted between a storage orientation wherein said first and second planes are generally parallel and a loading position; and means slidably coupling said guide rail extensions to said path defining means whereby said tilt frame assembly may be moved linearly when said first plane is oriented parallelly with respect to said second plane.

4. The apparatus of claim 3 wherein said path defining means comprises a pair of parallel guide rails and wherein said means for slidably coupling engages both of said guide rails and said guide rail extensions.

5. The apparatus of claim 3 wherein the position of said counterbalancing means may be varied relative to said pivot axis.

6. The apparatus of claim 5 wherein said path defining means comprises a pair of parallel guide rails and wherein said means for slidably coupling engages both of said guide rails and said guide rails extensions.

* * * * *